United States Patent [19]
Fukushima

[11] Patent Number: 5,279,182
[45] Date of Patent: Jan. 18, 1994

[54] COOLING MECHANISM FOR BUILT-UP FLYWHEEL

[75] Inventor: Hirotaka Fukushima, Neyagashi, Japan

[73] Assignee: Kabushiki Kaisha Daikin Seisakusho, Neyagawa, Japan

[21] Appl. No.: 3,831

[22] PCT Filed: Jul. 11, 1990

[86] PCT No.: PCT/JP90/00893

§ 371 Date: Apr. 1, 1991

§ 102(e) Date: Apr. 1, 1991

[87] PCT Pub. No.: WO91/02909

PCT Pub. Date: Mar. 7, 1991

Related U.S. Application Data

[63] Continuation of Ser. No. 667,404, Apr. 5, 1991, abandoned.

[30] Foreign Application Priority Data

Aug. 25, 1989 [JP] Japan ................. 1-99451[U]

[51] Int. Cl.⁵ .................. F16F 15/30; F16D 13/72
[52] U.S. Cl. ......................... 74/572; 74/574; 192/113 AD
[58] Field of Search ......... 74/572-574; 192/113 AD, 113 AS, 113 AP, 70.12, 70.14, 107 R, 106.2; 464/66, 68

[56] References Cited

U.S. PATENT DOCUMENTS

| | | | |
|---|---|---|---|
| 3,581,855 | 6/1971 | Taeffner | 192/113 AD |
| 3,809,192 | 5/1974 | Stehle | 192/113 A |
| 4,139,085 | 2/1979 | Kanbe et al. | 192/113 A |
| 4,294,343 | 10/1981 | Reh | 192/113 A |
| 4,727,970 | 3/1988 | Reik et al. | 192/113 A |
| 4,788,884 | 12/1988 | Reik et al. | 74/574 |
| 4,886,153 | 12/1989 | Takenaka et al. | 192/113 A |

FOREIGN PATENT DOCUMENTS

| | | | |
|---|---|---|---|
| 0223493 | 5/1958 | Australia | 192/113 A |
| 2259806 | 7/1973 | Fed. Rep. of Germany | 192/70.12 |
| 2808019 | 9/1981 | Fed. Rep. of Germany | |
| 2826274 | 4/1982 | Fed. Rep. of Germany | 74/574 |
| 48-43044 | 8/1973 | Japan . | |
| 54-32134 | 10/1979 | Japan . | |
| 59-29842 | 2/1984 | Japan | 74/572 |
| 59-68842 | 5/1984 | Japan . | |
| 60-191742 | 12/1985 | Japan . | |
| 62-92490 | 4/1987 | Japan . | |
| 63-36196 | 9/1988 | Japan . | |
| 63-259244 | 10/1988 | Japan . | |
| 0174326 | 3/1989 | Japan | 192/113 A |
| 1-98351 | 6/1989 | Japan . | |
| 0814062 | 5/1959 | United Kingdom | 74/574 |

Primary Examiner—Carl D. Friedman
Assistant Examiner—Winnie Yip

[57] ABSTRACT

In a built-up flywheel comprising a first flywheel (12), a second flywheel (30) and a clutch covering body (32), a cooling mechanism is provided which has a cooling port (52) formed in the inner periphery of said second flywheel (30) and a cooling groove (50) arranged generally radial at the front surface of said second flywheel (30) so as to rake the air inside said clutch covering body (32) discharged from said cooling port outwards in a radial direction. The cooling port (52) forms a circulating route of the cold air, so that the atmospheric cold air can be effectively supplied into the clutch covering body (32), and the frictional face of the second flywheel (30) can be cooled. Moreover, the cooling groove (50) works to discharge the air inside the clutch covering body (32) positively outside through the cooling port (52), rendering the pressure inside the clutch covering body (32) negative, whereby the atmospheric cold air can be further positively supplied into the clutch covering body (32).

13 Claims, 2 Drawing Sheets

COOLING MECHANISM FOR BUILT-UP FLYWHEEL

This application is continuation, of application Ser. No. 07/667,404 filed on Apr. 5, 1991, now abandoned.

TECHNICAL FIELD

The present invention relates to a cooling mechanism for a built-up flywheel of split type applicable to motor vehicles such as automobiles, industrial trucks, construction-site vehicles etc.

BACKGROUND ART

A built-up flywheel of the kind referred to above is generally provided with a first flywheel coupled to an output shaft at the engine side, a second flywheel elastically coupled to the rear surface of the first flywheel which is spaced a distance from the second flywheel and a clutch covering body secured to an outer periphery of the rear surface of the second flywheel.

The assignee of the present invention has already proposed some cooling mechanisms for cooling the above clutch covering body. For example, in U.S. Pat. No. 4,886,153, it is proposed that the lateral edge in the circumferential direction of a finger of a diaphragm spring used in the clutch covering body is notched to form wide slits and a vane member is provided in the slits to gather the cooling air.

Although the proposed cooling mechanism is able to cool the interior of the clutch cover effectively, it is not enough to cool the flywheel itself.

Meanwhile, a flywheel cooling mechanism proposed in Japanese Utility Model Laid-open Publication No. 48-43044 (43044/1973) has realized cooling of the flywheel. According to the proposal, a plurality of cooling fins are provided inwards at the side of a pressure plate of the flywheel, thereby raking the air inside the clutch cover to a pressuring surface of the flywheel.

Since the cooling fins are at the side of the pressure plate of the flywheel in the foregoing cooling mechanism and, no allowable space is there for the cooling fins, the area of the surface for each fin cannot be large. Therefore, it is impossible to obtain sufficient driving force (raking force) for the cooling air.

SUMMARY OF THE INVENTION

An essential object of the present invention is to provide a cooling mechanism for a built-up flywheel of split type wherein cooling ports communicating the interior of a clutch covering body and a space between a first and a second flywheels, and cooling grooves generally in the radial arrangement for raking the air inside the clutch covering body which is discharged from the cooling ports outwards in a radial direction are provided in the second flywheel.

In accomplishing the above-described object, according to the present invention, a second flywheel of a built-up flywheel which comprises a first flywheel coupled to an output shaft at the engine side, the second flywheel elastically coupled with a distance to the rear surface of the first flywheel and a clutch covering body secured to an outer peripheral part of the rear surface of the second flywheel has cooling ports formed in the inner periphery thereof which communicate the distance and the inside of the clutch covering body, and cooling grooves generally in the radial arrangement at the front face thereof to guide the air inside the clutch covering body discharged from the cooling ports outwards in a radial direction.

Accordingly, the rotating force at the engine side is transmitted smoothly to the second flywheel through the first flywheel. When the second flywheel is rotated, the pressure at the part in the vicinity of the inner periphery at the front surface of the second flywheel is rendered negative by the action of the cooling grooves, and therefore the air inside the clutch covering body is discharged outside through the cooling ports and guided out along the cooling grooves to the atmosphere.

BRIEF DESCRIPTION OF THE DRAWINGS

This and other objects and features of the present invention will become apparent from the following description taken in conjunction with one preferred embodiment thereof with reference to the accompanying drawings, in which.

BEST MODE FOR CARRYING OUT THE INVENTION

Figure 1:
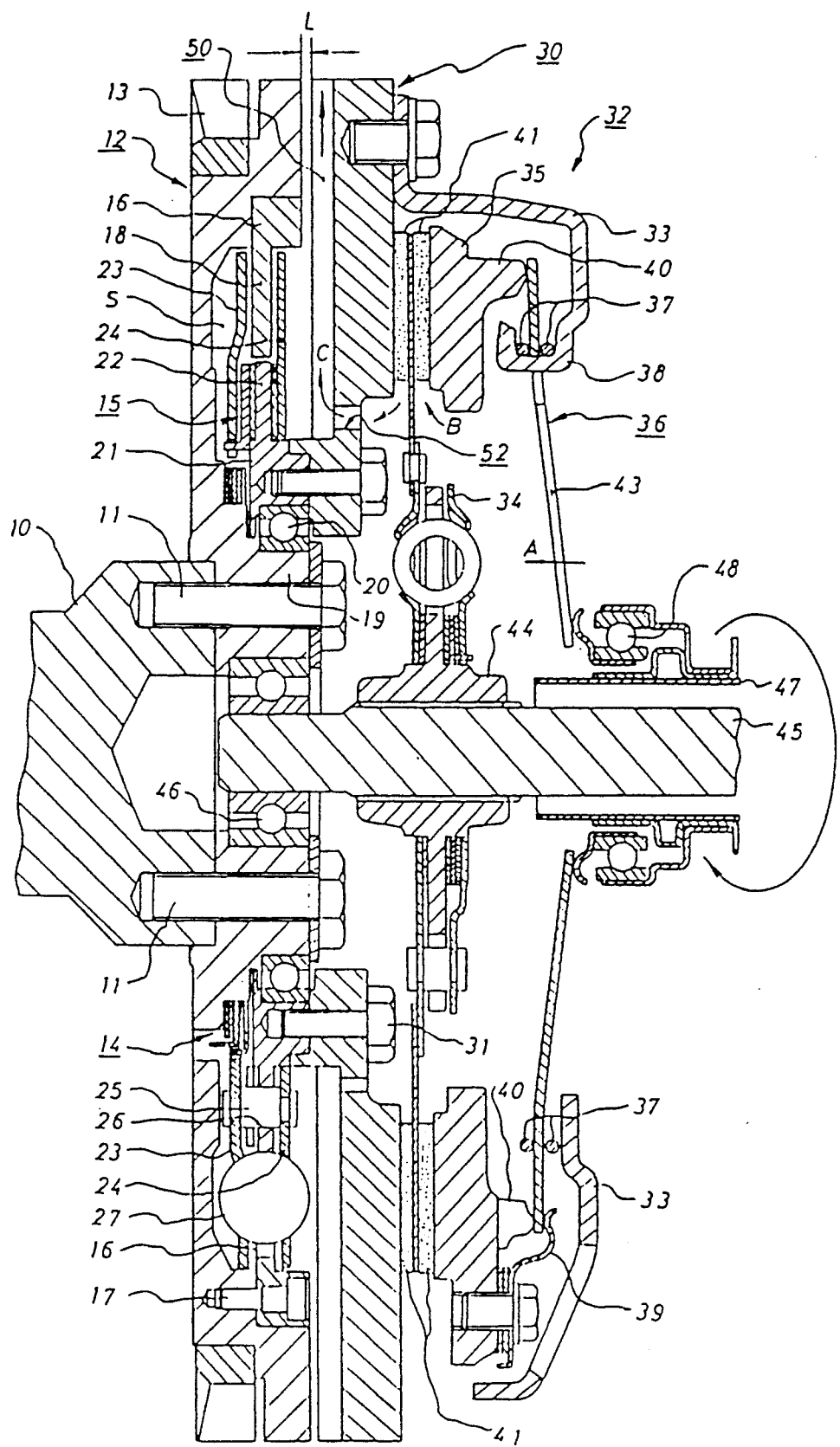
FIG. 1 is a cross sectional view of a cooling mechanism according to the present invention.

Before the description of the present invention proceeds, it is to be noted here that like parts are designated by like reference numerals throughout the accompanying drawings.

FIG. 1 illustrates a longitudinal cross sectional view of the cooling mechanism of the present invention, in which the left side of the drawing is supposed to be the front side of the mechanism.

Referring to FIG. 1, a first flywheel 12 is coaxially fixed through a bolt 11 to a rear end of a crank shaft 10 which is an output shaft of an engine. A ring gear 13 to which is input the motive power of a stator (not shown) is rigidly pressed into the outer periphery of the first flywheel 12. A looped space S is defined at the rear surface side of the first flywheel 12 to accommodate an intermediate friction generating mechanism 14 and a maximum friction generating mechanism 15 and the like. The detailed structure, operation and effects of the friction generating mechanisms 14 and 15 are explained in Japanese Patent Laid-open Publication No. 63-259244 (259244/1988).

An outer hub 16 is integrally fixed to the outer periphery at the rear surface of the first flywheel 12 by a bolt 17. The outer hub 16 has an inward flange 18 extending to the intermediate section of the space S. Further, a boss 19 protruding rearwards is integrally formed in the inner periphery of the first flywheel 12. An inner hub 21 is supported at the outer periphery of the boss 19 through a bearing 20. The inner hub 21 is placed confronting to the outer hub 16 on the same plane, having an outward flange 22 integrally provided therewith. The outward flange 22 extends outwards in the radial direction of the first flywheel to the intermediate section of the space S.

Side plates 23 and 24 are placed at the front and rear sides of the hubs 16 and 21 in a manner to be rotatable with relative relation therebetween. Moreover, the side plates 23 and 24 are integrally fixed to each other by a pin 25 at a plurality of points in the circumferential direction. The pin 25 passes through an elongated hole 26 of the outward flange 22. The elongated hole 26 extends a required distance in the circumferential direction of the outward flange 22.

Figure 2:
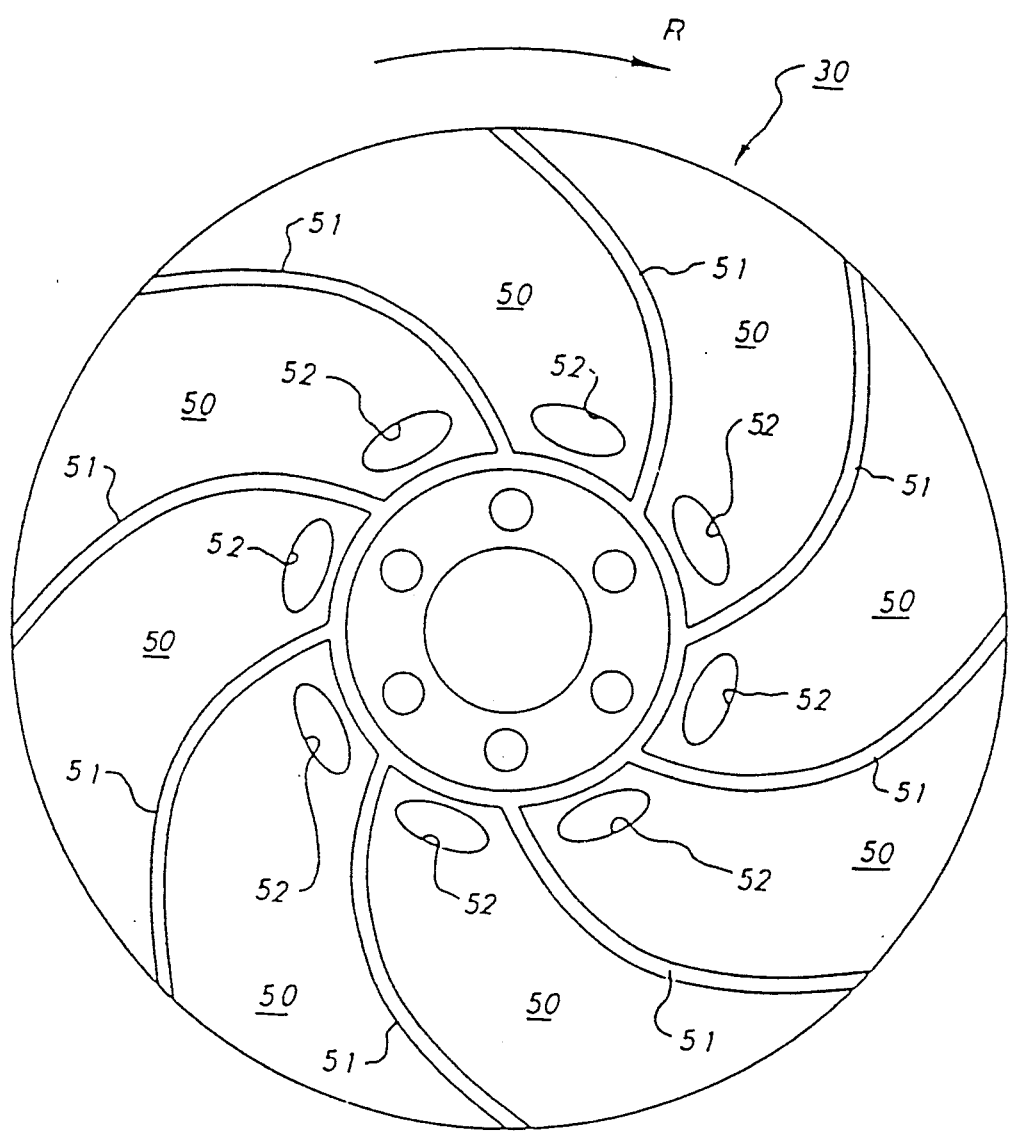
FIG. 2 is a front view of a second flywheel.

The side plates 23 and 24, and the inward flange 18 of the outer hub 16 are elastically coupled by a torsion spring 27. Therefore, the rotating force of the first flywheel 12 is smoothly transmitted from the inward flange 18 to the side plates 23 and 24 through the torsion spring 27 and further to the outward flange 22 of the inner hub 21. The inner periphery of a second flywheel 30 which will be depicted later with reference to FIG. 2 is secured to the rear surface of the inner hub 21 by a bolt 31 in such a manner that the second flywheel 30 is spaced a distance L from the first flywheel 12. The rotating force of the first flywheel 12 is transmitted last to the second flywheel 30. Since the distance L is set as small as possible, the driving force for the cooling air is improved.

A known clutch covering body 32 is rigidly secured to the rear surface in the outer periphery of the second flywheel 30 by a bolt.

Inside a main body 33 of the clutch covering body 32, there are coaxially mounted a looped clutch disk 34, a pressure plate 35 and a diaphragm spring 36 sequentially in this order from the front side of the mechanism. The diaphragm spring 36 is held by a pair of wire rings 37, and at the same time supported by a tub 38 in the inner periphery of the main body 33. The outer periphery of the diaphragm spring 36 is always kept to butt against a protrusion 40 of the pressure plate 35, thereby urging the pressure plate 35 forwards. Therefore, in the state where the clutch is actuated as indicated in the drawing, the pressure plate 35 is allowed to press a frictional facing 41 of the clutch disk 34 against the second flywheel 30. Many slits 43 are formed in the diaphragm spring 36 (only one slit is shown in FIG. 1) which extend in the radial direction of the clutch, so that the cooling air is supplied into the main body 33 through the slits 43.

A hub 44 of the clutch disk 34 is fitted through a spline in the outer periphery of a shaft 45 which is an input shaft of a transmission gear (not shown). A front end of the shaft 45 is supported at the inner periphery of the first flywheel 12 via a bearing 46. A cylindrical shaft 47 is coaxially mounted in the outer rear periphery of the shaft 45, on which a release bearing 48 is slidably mounted in the axial direction. The release bearing 48 is arranged to interlock with a clutch connection blocking mechanism (not shown). When the blocking mechanism is operated to drive the release bearing 48 forwards, the inner periphery of the diaphragm spring 36 is pressed forwards by the release bearing 48. In consequence, the diaphragm spring 36 is turned at a fulcrum of the wire springs 37, releasing the pressure plate 35 and interrupting the connection of the clutch.

As shown in FIG. 2, the second flywheel 30 is an integral molding of cast iron, having cooling grooves 50 formed at the front surface thereof. The grooves 50 are arranged generally radial, curving to the advancing side in the rotating direction (shown by an arrow R) and spreading outwards from the inner periphery of the second flywheel 30. Since the width of the cooling groove 50 in the circumferential direction is set considerably large, a diaphragm or portion wall 51 between the adjacent grooves 50 works as a centrifugal fin and also provides a small clearance with the rear side of the first flywheel 12.

A cooling port 52 is formed at the inner peripheral part of the groove 50 of the second flywheel 30. The cooling port 52 is generally elliptic, elongated in the circumferential direction of the second flywheel. When the flywheel is built up to communicate the inner space of the main body 33 and the space S of the first flywheel 12 (FIG. 1), the air guided by the cooling grooves 50 passes the cooling ports 52 as will be described later.

In the above construction, when the clutch is actuated as in FIG. 1, the rotating force at the engine side is transmitted from the crank shaft 10 to the first flywheel 12, and from the inward flange 18 of the outer hub 16 to the side plates 23 and 24 through the torsion spring 27, and to the outward flange 22 of the inner hub 21 through contact of the pin 25 with the end face of the elongated hole 26. Furthermore, the rotating force transmitted to the second flywheel 30 is, through the clutch disk 34, transmitted smoothly to the shaft 45.

When the clutch connection blocking mechanism is operated to disconnect the clutch, the release bearing 48 is driven forwards to press the inner periphery of the diaphragm spring 36. As a result, the diaphragm spring 36 is turned at a fulcrum of the pair of wire springs 37, whereby the pressure plate 35 releases the frictional facing 41 of the clutch disk 34 to disconnect the clutch.

During the foregoing operation, the air inside the space S is blown away outwards in the radial direction by the cooling grooves 50 due to the centrifugal force caused by the rotation of the second flywheel 30, and therefore the pressure in the interior of the space S becomes negative. Accordingly, the outside air is sent into the main body 33 from the rear surface of the diaphragm spring 36 in a direction shown by an arrow A through the slits 43. Owing to the centrifugal force of the rotation of the clutch disk 34, this cooling air is splashed outwards in the radial direction of the clutch disk 34 as indicated by an arrow B thereby to cool the frictional facing 41 and friction face of the second flywheel 30.

On the other hand, the peripheral air is stirred along the cooling grooves 50 because of the rotation of the second flywheel 30 and discharged outwards in the radial direction, so that the pressure in the vicinity of the inner periphery at the rear surface of the second flywheel 30 is rendered negative. Consequently, the air which has absorbed the frictional heat inside the main body 33 is discharged outside of the main body 33 through the cooling ports 52 as indicated by an arrow C, and led out along the cooling grooves 50. Accordingly, the pressure inside the main body 33 becomes negative. The atmospheric cold air can thus be positively circulated in the main body 33.

As is described hereinabove, according to the present invention, the cooling ports 52 work as a circulating route for the cooling air, so that the cold air in the atmosphere can be effectively led into the main body 33, with cooling the friction surface of the second flywheel 30. Moreover, since the air inside the main body 33 is positively discharged outside via the cooling ports 52 along the cooling grooves 50 thereby to reduce the pressure inside the main body to be negative, the cold air can be further positively supplied into the main body 33.

In the structure described hereinabove, the cooling grooves 50 are formed at the front surface of the second flywheel 30. Therefore, the area of the surface of each cold groove 50 can be set large, making it possible to offer sufficient driving force for the cooling air.

Since the distance L between the first flywheel 12 and the second flywheel 30 is made as small as possible in the foregoing embodiment, it also contributes to an increase of the driving force of the cooling air by the cold grooves 50.

INDUSTRIAL APPLICABILITY

Accordingly, the present invention is highly useful to enlarge the cooling effects in motor vehicles such as automobiles, industrial or construction-site vehicles, etc.

I claim:

1. A built-up flywheel comprising a first flywheel coupled to an output shaft of an engine, a second flywheel coupled elastically to a rear side of said first flywheel with space being located between said first flywheel and said second flywheel, a clutch covering body secured to an outer periphery at the rear surface of said second flywheel, and a clutch disk with a frictional facing positioned inside the clutch covering body, the frictional facing being engageable with and disengageable from the second flywheel, means for supplying said clutch covering body with air, said means including openings in a diaphragm spring supported by said clutch covering body, and cooling means including a cooling port formed in an inner periphery of said second flywheel to communicate said space with the interior of the clutch covering body, the cooling port being spaced from an area of the second flywheel which the frictional facing of the clutch disk engages such that the cooling port is free of contact with the frictional facing, and said cooling means also including a cooling groove formed throughout their extent generally radially on the front surface of said second flywheel and facing the space between the first and second flywheel so as to rake the air inside said clutch covering body and discharge it out from said cooling port outward in a radial direction.

2. A cooling mechanism for a built-up flywheel as claimed in claim 1, wherein said cooling grooves in said second flywheel are curved.

3. A cooling mechanism for a built-up flywheel as claimed in claim 1, wherein a diaphragm defining said cooling grooves confronts to said first flywheel with a distance as small as possible.

4. A cooling mechanism for a built-up flywheel as claimed in claim 1, wherein said cooling port is a hole elongated generally in a circumferential direction.

5. A cooling mechanism for a built-up flywheel as claimed in claim 1, wherein said cooling port is opened generally at an end part in the inner periphery of said cooling groove.

6. A cooling mechanism for a built-up flywheel as claimed in claim 1, wherein the cooling port has openings, the openings to the cooling port are generally flush with the second flywheel.

7. A second flywheel coupled elastically with a distance to a rear side of a first flywheel, which has cooling ports formed in an inner periphery thereof communicating said distance with an interior of a clutch covering body, cooling means for raking the air inside said clutch covering body discharged from said cooling ports outward in the radial direction of said second flywheel, said cooling means including grooves formed throughout their extent generally radial in a front surface of said second flywheel and facing the first flywheel, said grooves extending in a curved radial direction so that an outer portion of said grooves is positioned circumferentially behind an inner portion of said grooves during rotation of said second flywheel and means supplying said clutch covering body with air, said means including openings in a diaphragm spring.

8. A second flywheel as claimed in claim 6, wherein said cooling port is a hole elongated generally in a circumferential direction of said flywheel.

9. A second flywheel as claimed in claim 6, wherein said cooling port is opened generally at an end part in the inner periphery of said cooling groove.

10. A second flywheel as claimed in claim 7, wherein the cooling port has openings, the openings to the cooling ports are generally flush with the second flywheel.

11. A second flywheel as claimed in claim 10, wherein the cooling port has an elongated shape in a circumferential direction.

12. A built-up flywheel comprising a first flywheel coupled to an output shaft of an engine, a second flywheel coupled elastically to a rear side of said first flywheel with a space being located between said rear side of said first flywheel and a front side of said second flywheel, a clutch cover assembly fixedly secured to an outer periphery at a rear side of said second flywheel, cooling means including a cooling port having a cross-section elongated in a circumferential direction provided at an inner periphery of said second flywheel to connect between said space and an interior of said clutch cover assembly, said cooling means also including a cooling groove provided in said front side of said second flywheel, said cooling groove faces the first flywheel, said cooling port opens into an end portion of said cooling groove, said cooling groove of said cooling means provides for removing the air within the interior of said clutch cover assembly which has been exhausted from said cooling port and directing the air in a radial direction toward an exterior of said second flywheel, said groove throughout its extent extends in a curved radial direction so that an outer portion of said groove is positioned circumferentially behind an inner portion of said groove during rotation of said second flywheel, and a partition wall located on said second flywheel alongside said cooling groove to provide a small clearance with said rear side of said first flywheel.

13. A built-up flywheel as claimed in claim 12, wherein openings to the cooling port are generally flush with the second flywheel.

* * * * *

UNITED STATES PATENT AND TRADEMARK OFFICE
CERTIFICATE OF CORRECTION

PATENT NO. : 5,279,182
DATED : January 18, 1994
INVENTOR(S) : Hirotaka Fukushima It is certified that error appears in the above-indentified patent and that said Letters Patent is hereby corrected as shown below:

On the title page:

Item [75] : Please change the inventor's address from "Neyagashi" to --Neyagawa--

Signed and Sealed this

Twenty-seventh Day of September, 1994

Attest:

BRUCE LEHMAN

Attesting Officer     Commissioner of Patents and Trademarks